May 14, 1940.  P. M. G. TOULON  2,201,066
SCREEN TELEVISION RECEIVER
Filed July 1, 1937
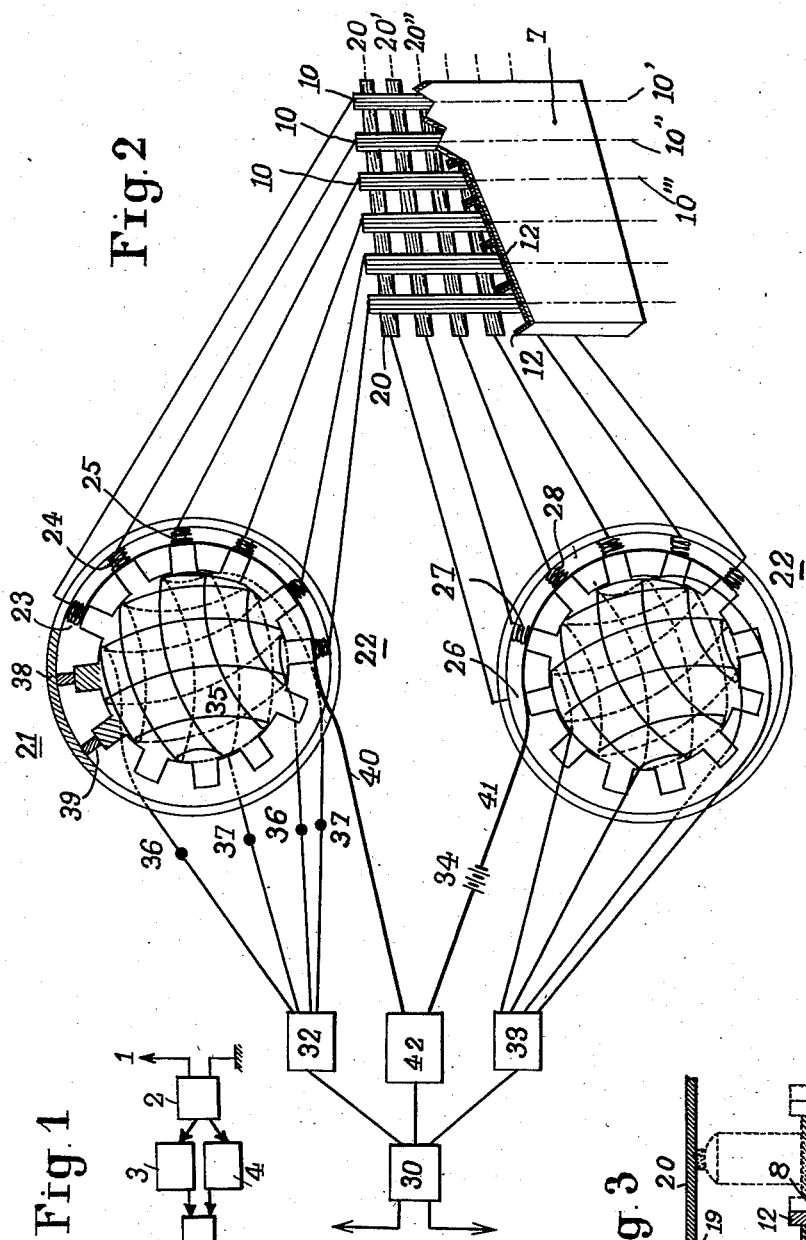
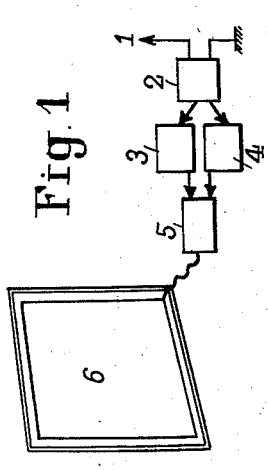
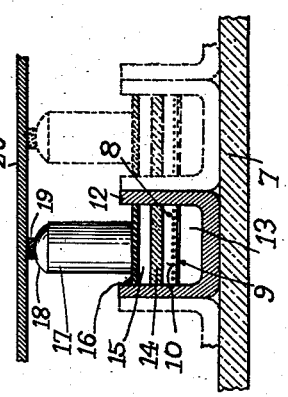
INVENTOR
P.M.G. TOULON
By Blair Kilgore, ATTYS.

Patented May 14, 1940

2,201,066

UNITED STATES PATENT OFFICE 2,201,066

SCREEN TELEVISION RECEIVER

Pierre Marie Gabriel Toulon, Puteaux, France

Application July 1, 1937, Serial No. 151,521
In France July 9, 1936

5 Claims. (Cl. 178—7.3)

The present invention relates to receivers of images of stationary or moving objects (television) and it has particularly for its object a new type of receiving screen, various modes of construction thereof and various methods of scanning it.

The screen television receivers hitherto constructed may be sub-divided into three groups; firstly, receivers employing a source of light modulated by the image currents (electric discharge tubes, Kerr cell). By means of a mechanical scanning system (for example, Weiller wheel), the modulated light is projected onto a white screen in the form of a moving enlarged luminous spot. All these receivers have the same defect of a too weak luminous intensity and the observation of the image can therefore be done only in the darkness. Then come the Braun tubes having a fluorescent screen, the particles of which are transformed, under the effect of the impact of the electronic beam, into sources of modulated light. The image received on such a screen is small and its luminosity is not sufficient to enable it to be enlarged by projection onto a white screen. Such tests have been made but gave relatively dull images which had to be observed only in complete darkness. Finally, use has also been made, for obtaining relatively luminous large images, of screens comprising a large number of small lamps (electric discharge tubes for example), each constituting a source of light modulated by the image current. These screens were bulky, the light emitted by a lamp influenced the luminous state of the adjacent lamps and the sharpness suffered thereby; moreover, these screens could not be produced in practice for a very large number of elements and they therefore did not lend themselves to high-definition reception.

According to the present invention, use is made of a screen composed of a plurality of variable elements receiving the transmitted image impulses, this image being reconstituted as a result of the modulation, by its elements, of the light to which this screen is exposed. The light in question may be daylight or the artificial illumination of the room in which this screen is placed. The latter comprises a multi-elementary plane surface, continuous or not, the elements of which work by reflection or preferably by diffusion. This screen may be mounted in the same cabinet as the receiving set or at some other suitable place. The image may be observed directly on this screen from several directions. The use of light-diffusing elements forming the screen, which presents itself, for example, as a board or a photographic enlargement fixed to the wall and on which the observed image varies continuously, offers remarkable advantages over the receivers known at present, for example, those having Braun tubes or electric discharge tubes combined with a mechanical analyser; the image may be observed in a lighted room; in effect, the light diffused by the surface is very considerable and it varies automatically with the intensity of the illumination which exists in the room. The image is of very large size and may be observed by a very large number of persons at the same time and by standing almost anywhere in the room, that is, from several directions. The frame itself is easily handled, it is not fragile and is above all not very bulky. Moreover, it may be directed in the most agreeable manner for the eye of the observer. Owing to the fact that the image appearing on this frame can be viewed under the normal conditions of illumination, for example, in the interior of a living room, the image appearing on this frame can therefore be observed under the normal conditions of life, that is, without changing anything at all in one's customs.

All these remarkable results arise from the property of the electro-optical elements employed in the construction of this frame, of diffusing the light, that is, reflecting the light indifferently in all directions so that an observer can see all the elements at the same time, as a function of the electrical vision impulses which they receive. For the construction of such an element, use may be made of any simple or complex device which diffuses the light which falls thereon and of which either the coefficient of diffusion or the transparence, or the position, or eventually the coefficient of reflection, etc., varies as a function of the vision impulses received. One of the chief characteristics of the invention resides also in the fact that the modification to which the diffusing element is submitted as a result of the action thereon of the electrical image impulse, is made to subsist a certain time. This prolongation of the optical modification should preferably not exceed the interval of time elapsing between two successive scannings of the same element. In order to effect it, use may be made of electro-optical elements, for example, electrolytes comprising a coloured indicating reagent, of a nature such that the modification which they undergo under the action of an electrical impulse is prolonged in time; the electric circuits associated with the electro-optical elements may also be arranged in such a manner that the action of the electrical impulses on the element is prolonged. This last condition is preferably obtained by the storage of all the electrical vision impulses in special capacities or in the capacities formed by the element itself.

The screen forming the object of the present invention, working by diffusion, permits a much more advanced definition than the large screens comprising a multitude of incandescent lamps or discharge tubes, which it was attempted to produce some time ago.

Preferably, there is associated with each element of the diffusion screen an electric circuit, through which the vision currents are applied to it. The scanning of this screen, that is, the successive connection of the elements with the receiving set may be ensured in any suitable manner and particularly, for example, in accordance with one of the methods described in the American patent application Serial No. 102,062,—Toulon.

The object and the modes of execution of the invention will be more readily understood from the accompanying drawing which illustrates several particular cases by way of example, and in which Figure 1 is an enlarged schematic diagram of the installation;

Figure 2 is an enlarged view of the system showing the screen and the distributors; and Figure 3 is a horizontal sectional view of the light-diffusing screen.

Fig. 1 illustrates the general diagram of an installation comprising a light-diffusing screen forming an object of this invention. This screen 6 preferably comprises a plane frame which may be fixed to the wall. The surface of this screen may, for example, be produced by means of a material possessing electro-optical properties, that is, a material of which the transparency or the diffusing or reflecting power, or position, etc., varies under the action of certain effects, such as an electric field, a high or low-frequency magnetic field, or even under the action of a voltage or current, etc. This material, continuous or divided into elements, possesses the property that each of its parts can respond individually to the action to which it is subjected. In general, the transmission of the televised image is effected from the transmitting station with the aid of very short Hertzian waves.

The waves are received by the antenna 1, then amplified, selected and detected by the set 2. This set generally receives at the same time the synchronising signals, which act on a first system 3 which is hereinafter termed a "synchronising member," as well as the emission and image signals which act on a second system 4 adapted to furnish instantaneous currents proportional to the modulation.

In the example illustrated, the image signals are applied to all the elements of the screen 6 at the same time and the exploration of the screen is effected point by point, that is each of the points of the screen is successively sensitised in such a manner that the modulation received can act only on the sensitized elements, and this effect is successively produced for each of them, so that the whole of the surface is explored in a very short time. This sensitisation is obtained with the aid of a "distributing" member, which is synchronised by the signals furnished by the systems 3. The distributor 5 serves at the same time to apply the modulating current to the screen 6.

There may also be allotted to the member 5 the function of distributor only, and it is possible to ensure the modulation of the elements of the screen directly by the member 4.

Fig. 2 illustrates the general arrangement of a television receiver having a screen separated from the set, in which the elements of the screen diffuse the light of the room in which the frame is situated. This figure shows the cable which joins the screen to the receiving set and the wiring which ensures the static sensitisation of the various elements of the screen. The latter are arranged according to the vertical and horizontal lines, and advantage is taken of this arrangement to effect conveniently the successive sensitisation in a certain order.

Fig. 2 shows at 7 the front face of the screen and at 10 and 20 the vertical and horizontal bands which apply the voltages to the various elements of the screen. The electro-optical elements are arranged in the space between these bands and they are illustrated in detail in Fig. 3. The vertical bands 10 are preferably constructed as a fine grid, the meshes of which are very wide in order to obstruct as little as possible the visibility of the electro-optical elements situated behind and opposite and which reproduce the points of the televised image. The bands 20 placed behind the electro-optical elements may, on the contrary, conveniently be full.

These conducting bands are respectively connected to two distributors 21 and 22. The distribution of the voltages on these bands effects the successive sensitisation in time of all the elements of the surface. The distributors are arranged so as to give instantaneous voltage impulses successively on the different bands, as has been described for example in the above-mentioned co-pending application.

The distributors 21 and 22 are formed in the notches of a soft-iron framework 35 as follows: two phase or polyphase windings are arranged, one being situated between the terminals 36, the other between the terminals 37, and these windings are fed by means of a two-phase distributor 32. Thus, a rotating field is obtained. Around this framework, a circular armature 38 is arranged, and between the latter and the framework there is placed a rather large number of small cores 39 capable of becoming saturated very rapidly, for example, a nickel steel is employed which is known under the name of "permalloy" or "Mu metal". On each of these small cores there is placed a coil (23, 24, 25, etc.) The rotating field which arises in the framework 35 and which is closed by the armature 38 has the effect of successively causing a very rapid reversal of the flux in each small core 39 which is saturated in turn, and thus a voltage impulse of very short duration is obtained in each of the coils 23, 24, 25, etc. One of the extremities of the latter is common and constitutes the neutral point (common wire 40) of the distributor 21. The other extremity is joined to each of the vertical bands 10.

The construction of the distributor 22 is quite similar. It comprises two coils connected to the two-phase distributor 23, as well as windings 26, 27, 28, etc., arranged on the saturable cores and connected to the horizontal bands 20 of the screen. One of the extremities of the windings 26, 27, 28, etc., is common wire 41 and constitutes the neutral point of the distributor 22.

The wireless receiving set 30 allows of receiving at the same time the vision signals and the synchronising signals. The vision signals are selected and amplified by means of the amplifier 42. The modulation received by this vision amplifier is applied between the two neutral points 40 and 41 of these distributors 21 and 22.

The synchronising signals, after their selection, are employed for controlling the frequency and the phase of the two-phase distributors 32 and 33 which create the rotating field in the two distributors. These two-phased distributors are preferably formed with the aid of entirely static members, for example, by means of triodes and electric oscillating circuits.

Each electro-optical element is connected in series with a small rectifier or any other unilateral conducting device, as will be seen in the description of Fig. 3 and this assembly is arranged between the bands 10 and 20.

A negative polarising voltage 34 applied in series with the modulation furnished by the member 42 impedes the rectifier output and thus opposes the action of the modulation on the element when the distributor is not in service. All the elements of the screen may thus be connected simultaneously without disadvantage, to the receiving set or to a common vision signals channel.

If the distributors 21 and 22 give at the same time an instantaneous voltage capable of neutralising the polarising effect 34, the element placed at the point of crossing of the two corresponding bands is sensitised and the rectified modulation 42 can act on the electro-optical element.

Fig. 3 illustrates on an enlarged scale the details of the screen element with its rectifier which permits at the same time of sensitising it and prolonging the effect of the modulation. This figure corresponds to a section along a plane perpendicular to the screen. As electro-optical elements, a coloured chemical indicator has been employed, the colour of which is modified by the variation of concentration in ions due to the passage of the electric current. As coloured indicator, it would be preferable to employ bromothymol blue in a solution of sodium sulphate supplemented by a dilute solution of soda. The very great sensitivity of the coloured indicator mentioned furnishes almost instantaneously a modification of the colouration (transition from yellow to blue) in the vicinity of the electrodes under the action of a very feeble current. To localise this colouration in the vicinity only of one of the electrodes, a semi-permeable diaphragm 14 is employed, which localises it in the vicinity of the grid 10 where this variation of colouration is observed.

In Fig. 3, 7 denotes the general support of glass, which constitutes the front face of the screen, that is, the side where the image is viewed. Along this sheet of glass, a large number of folded transparent bands of Celluloid 12 have been fixed, which constitute tight vertical elementary tanks (see Fig. 2). In these tanks there are placed all the electro-optical elements of a vertical line. Each tank is divided into two parts by a sheet of transparent collodion 9. The electrolyte situated in the front part 13 is transparent, while in the rear part the sensitive colourant 8 is arranged.

A grid of very fine wire 10 constitutes a common electrode of all the electro-optical elements of a vertical line.

With reference to Fig. 3, there is found successively in each element a very small quantity of electrolysable liquid 8 containing the coloured reagent, a porous wall 14 consisting, for example, of a sheet of asbestos paper and another quantity of electrolysable liquid 15 as well as the electrode 16. In each vertical tank, these electrodes 16 are arranged one above the other and are insulated from one another. The electrode 16 of the rear part is connected to a rectifier which, in the present example, comprises a tablet of copper oxide. At 17 there is shown the copper which serves as support for this tablet, at 18 the crystals of copper oxide, at 19 the current supply of the tablet which consists generally in a deposit of colloidal silver and at 20 the conducting band which interconnects all the current supply connections of the tablets of a horizontal line.

The elements described in Fig. 3, which are placed one below the other in the tank 12, extend from the top to the bottom of the screen and their face is electrically connected by the transparent metallic band 19.

The screen itself comprises the juxtaposition, in the same plane, of a large number of tanks 12. The elements situated on the same horizontal line of the various tanks are interconnected by their respective conducting bands 20.

The spectator situated on the side of the glass 7 can see through the liquid 13 the colourant 8 diffusing the incident light or colouring the light diffused by the white sheet of asbestos 14 of the diaphragm and translating the brilliancy of the point televised.

Of course, by employing several differently coloured electro-chemical indicators and by suitably varying the voltages applied, colour television may be obtained on these tanks.

The rectifier associated with the electro-chemical element fulfills not only the function of the sensitiser ensuring the scanning, but owing to the electrostatic capacity of the element, the charge which it has allowed to pass under the impulse of the rectified modulating current flows away only very slowly owing to the imperfect insulation; therefore, the optical modification undergone by the elements persists a certain time. The slowness of the process of chemical transformation also contributes to improving this effect.

This prolongation of the diffusing action of the elements is very important to enable the reconstituted image to be directly observed on the assembly of these elements. In effect, as the duration of the electrical vision impulse transmitted is excessively short, if the elements functioned only during the time of this impulse, the light diffused by the screen would remain always the same as in the absence of transmission; that is, the screen would appear entirely uniformly white or entirely black, according to whether in their position of rest the elements appear white or black.

In the example mentioned, the light diffused by the elements may proceed indifferently from the colouration of the particles of the liquid 8, which then behaves as a lacquer, or, on the contrary, the coloured liquid may play the part of a transparent painting which modifies the colour of the white surface of the asbestos sheet 14.

Instead of allotting a tablet of copper oxide to each element, the number of these tablets may be reduced, use being made only of a single rectifier per band 10 or 20, on condition of adding to these bands, circuits presenting a certain time constant having for effect to ensure the successive operation of the elements.

The frequency of the carrier wave may also be continuously varied and thus there may be allotted to each point or group of points of the image a determined frequency which acts on a single corresponding element (or groups of elements) of the screen. As in the example of Fig. 3, it is possible, of course, to extend in time the operation of each element of the screen, by adding to it devices such as rectifiers and capacities having a prolonged action, or by spreading in time the impulse of a determined frequency corresponding to each point.

Finally, according to another modification of the invention, while allotting to the modulating current themselves the function of a distributor, owing to their particular characteristics as a function of the position of the point transmitted, the receiver is constructed so that all the elements or a part of them enter into operation simultaneously under the effect of the image currents. For this purpose, at the receiving set, a complex wave of multiple frequencies is created, each of the various frequencies having, owing to the modulation by the received signal, a certain amplitude corresponding to the brilliancy of a certain point of the image. The whole of the elements of the screen is simultaneously subjected to the action of this complex wave. As each element is tuned to a certain frequency, the result is that it enters into resonance with an amplitude which corresponds to the brilliancy of a corresponding point of the televised subject.

Of course, instead of looking directly at the screen, it may be very strongly illuminated by means of a local source light and its enlarged image may be projected onto another screen of much greater dimensions. The image appearing on the screen may also be observed through a lens.

I claim:

1. Screen for the reception of television images comprising a frame, a multiplicity of light diffusing electro-optical elements diffusing the light which falls on them arranged in juxtaposition on said frame so as to form a surface on which the moving image may be observed directly, individual electric connections for each of said electro-optical elements for applying the image signals thereto, and a unilaterally conductive device interposed in each of said connections in series with the element supplied by said connection and forming an integral assembly with said electro-optical element.

2. Screen for the reception of television images comprising a frame, a multiplicity of light diffusing electro-optical elements diffusing the light which falls on them, arranged in juxtaposition on said frame so as to form a surface on which the moving image may be observed directly, individual electric connections for each of said electro-optical elements for applying the image signals thereto, a unilaterally conductive device interposed in each of said connections in series with the element supplied by said connection and forming an integral assembly with said electro-optical elements, and a resistance-capacity circuit associated with each electro-optical element whereby the action of said element is sustained for a constant time period.

3. Screen for the reception of television images comprising a frame, a multiplicity of light diffusing electro-optical elements diffusing the light which falls on them arranged in juxtaposition on said frame so as to form a surface on which the moving image may be observed directly, individual electric connections for each of said electro-optical elements for applying the image signals thereto, and a unilaterally conductive device interposed in each of these connections in series with the element supplied by said connection and forming an integral assembly with said electro-optical elements, said electro-optical elements constituting capacities which store the image signals for a predetermined time.

4. Screen for the reception of television images comprising a frame having slight conductivity, a multiplicity of light diffusing electro-optical elements diffusing the light which falls on them arranged in juxtaposition on said frame so as to form a surface on which the moving image may be observed directly, individual electric connections for each of said electro-optical elements for applying the image signals thereto, and a unilaterally conductive device interposed in each of said connections in series with the element supplied by said connection and forming an integral assembly with said electro-optical element, said electro-optical elements constituting capacities which store the image signals, said frame serving as a leakage resistance permitting the stored image signals to leak away after a given period of time.

5. Device for reproducing an image element in a television screen comprising a container of transparent material, a transparent front electrode within said container, a back electrode having a light diffusive surface within said container, a porous partition between said electrodes, a liquid chemical indicator within said container, a terminal member, and a unilaterally conductive device interposed between said back electrode and said terminal member.

PIERRE MARIE GABRIEL TOULON.